United States Patent [19]

Kumar

[11] Patent Number: 5,777,577

[45] Date of Patent: Jul. 7, 1998

[54] SATELLITE SELECTION

[75] Inventor: Vinod Kumar, Paris, France

[73] Assignee: Alcatel Mobile Communication France, Paris, France

[21] Appl. No.: 557,081

[22] PCT Filed: Jun. 7, 1994

[86] PCT No.: PCT/FR94/00669

§ 371 Date: Dec. 6, 1995

§ 102(e) Date: Dec. 6, 1995

[87] PCT Pub. No.: WO94/29969

PCT Pub. Date: Dec. 22, 1994

[30] Foreign Application Priority Data

Jun. 7, 1993 [FR] France .................................. 93 06793

[51] Int. Cl.⁶ .................................................. H04B 7/185
[52] U.S. Cl. ................................... 342/352; 455/12.1
[58] Field of Search ............................ 342/352, 353; 455/12.1

[56] References Cited

U.S. PATENT DOCUMENTS

| | | | |
|---|---|---|---|
| 4,797,677 | 1/1989 | MacDoran et al. | 342/352 |
| 4,876,736 | 10/1989 | Kiewit . | |
| 5,446,465 | 8/1995 | Diefes et al. | 342/357 |

Primary Examiner—Theodore M. Blum
Attorney, Agent, or Firm—Sughrue, Mion, Zinn, Macpeak & PLLC

[57] ABSTRACT

A device for selecting a primary satellite for a terminal (T) in a radiocommunication system having a number of moving satellites comprises measurement means for determining location information (D) on the basis of the position of the terminal with respect to each of the neighboring satellites (S1, S2, S3) on which it has becomed synchronized, estimation means for estimating the period of visibility of each of the satellites on the basis of the location information, and selection means for selecting the satellite (S2) having the longest estimated visibility.

10 Claims, 5 Drawing Sheets

SATELLITE SELECTION

BACKGROUND OF THE INVENTION

The present invention concerns satellite selection.

The field of the invention is that of radiocommunications, to be more precise that of satellite radiocommunication networks in which a terminal connects to a satellite by means of radio wave to benefit from services offered by a network of this kind.

The network comprises a plurality of satellites travelling around the Earth, usually in more than one orbital plane, so that a terminal can always access at least one so-called proximity satellite. In the present context it is considered that radio transmission can be established effectively between the terminal and several proximity satellites Moreover, it is understood that the terminal has acquired synchronization to the satellites. If the terminal wishes to access the network, by a process known as logging on, it must choose a satellite from the proximity satellites. Since the satellite is not geostationary, transmission between it and the terminal will eventually be interrupted and at this time the problem arises of assigning a new satellite to the terminal, by a process known as changeover.

Similar problems of both types arise in terrestrial radiocommunication systems, for example the GSM pan-European digital cellular mobile radio system. In this case, a terminal and a base station communicate using communication channels carrying radio signals. These systems comprise a plurality of channels for transmission from the terminals to the base stations or for transmission from the base stations to the terminals.

These channels include a control channel that is transmitted continuously and that enables a terminal to access the system via the base station transmitting this channel in order to set up calls. The terminal must therefore identify this control channel in order to acquire the information enabling it to declare itself within the system. This information includes synchronization information and this procedure is therefore usually called the synchronization procedure.

In the solution generally adopted for such synchronization, which is covered by GSM Recommendations 4.08 and 5.08, the synchronization procedure is carried out in two stages. Initially the terminal measures the power of all the receive channels. The terminal then attempts to synchronize to the channel it receives at the highest power; if it fails to do this, it tries the other channels in decreasing received power order, until it is eventually able to synchronize.

This solution is well suited to terrestrial systems since the higher the power of a channel the better the connection. Furthermore, to a first approximation, the higher this power the shorter the distance between the terminal and the base station, with the result that this procedure tends to optimize the performance of the system.

This solution is not well suited to satellite systems since the signals transmitted by different proximity satellites are attenuated by similar amounts at the terminal. Moreover, the distance between a terminal and a satellite does not have a first order effect on the performance of the system.

Also, in a terrestrial network, when a terminal already connected to a base station receives the signals that the latter is transmitting at too low a power, the terminal is transferred to a new base station by a procedure known as handover. A selector device provided for this purpose selects the new base station, usually on the basis of several criteria. These criteria include the power level at which the terminal receives from the various neighboring base stations around it. An additional criterion often taken into account reflects the number of channels available in these neighboring stations, with the aim of ignoring a base station that is already overloaded.

The received power criterion cannot be used to decide to assign a new satellite to an already connected terminal, by the procedure known as changeover, for the reasons already mentioned.

SUMMARY OF THE INVENTION

Accordingly, an aim of the present invention is to provide means for selecting a satellite when a terminal logs on to a satellite radiocommunication network and assigning a new satellite to the terminal when the connection with the present satellite cannot be maintained.

This aim is achieved by adopting as the decisive criterion the time that will elapse before any transmission between the terminal and a given satellite is interrupted, rather than the power at which a signal is received from the satellite.

This provides a device for selecting a satellite for a terminal of a radiocommunication system comprising a plurality of non-geostationary satellites. This device comprises measuring means for establishing location information dependent on the position of the terminal relative to each of the proximity satellites with which it has acquired synchronization, estimator means for estimating the time for which each satellite will be in view from the location information and selector means for selecting whichever of the satellites has the longest estimated time in view.

This provides a location device for a terminal of a radiocommunication system comprising a plurality of non-geostationary satellites and an assignment device for assigning a satellite to the terminal. The terminal having acquired synchronization to a plurality of proximity satellites, this device comprises measuring means for establishing location information dependent on the position of the terminal relative to each of the proximity satellites, estimator means for estimating the time for which each of the proximity satellites will be in view on the basis of the location information and transmission means for transmitting to the assignment device the estimated time in view of at least two of the proximity satellites for which this time is the longest.

This also provides an assignment device for a radiocommunication system comprising a plurality of non-geostationary satellites adapted to assign a satellite to a terminal from among a plurality of proximity satellites to which the terminal has acquired synchronization. In a first embodiment of the assignment device, the terminal comprising measuring means for establishing location information dependent on its position relative to each of the proximity satellites, estimator means for estimating the time for which the proximity satellites will remain in view on the basis of the location information and transmission means for transmitting to the assignment device the estimated time in view of at least two of the proximity satellites, it selects a satellite according to the estimated times in view transmitted by the terminal. In a second embodiment of the assignment device, the terminal comprising measuring means for establishing location information dependent on its position relative to each of the proximity satellites and transmission means for transmitting to the assignment device the location information of at least two of the proximity satellites, it comprises estimator means for estimating the time in view of the proximity satellites on the basis of the location information transmitted by the terminal in order to select a satellite in accordance with the estimated times in view.

An advantageous solution, when each satellite transmits a separate carrier, is for the measuring means to produce location information in the form of the Doppler shift of the carrier at a first time.

This provides a convenient way of obtaining the location information.

Regardless of the device in question, a first option is to choose the estimated time in view as an increasing function of the value of the Doppler shift at this first time.

A second option is for the measuring means to produce also the value of the Doppler shift at a second time separated from the first time by a measurement period, a form factor defined as the ratio of the difference between the Doppler shifts at the first time and at the second time to the measurement period assigned the sign of the Doppler shift at the first time, the estimated time in view being an increasing function of the inverse of the form factor.

A third option is for the measuring means to produce also the value of the Doppler shift at a second time, a form factor being defined as the ratio of the sum of the difference between the Doppler shifts at the first time and at the second time, the estimated time in view being an increasing function of the form factor.

A fourth option is for the measuring means to produce also the value of the Doppler shift at a second time separated from the first time by a measurement period, the function representing the Doppler shift, in particular the disappearance time, being determined from the values of the Doppler shift at the first and second times, the estimated time in view being equal to the difference between the time of disappearance and the second time.

In one embodiment of the location device, the terminal having acquired synchronization to a plurality of proximity satellites, the device comprises measuring means for establishing location information dependent on the position of the terminal relative to each of the proximity satellites and transmission means for transmitting the location information to the assignment device.

Also, each of the satellites transmitting a separate carrier, the location information is the Doppler shift of the carrier.

The present invention will now emerge in more detail from a reading of the following description with reference to the appended drawings, in which:

DETAILED DESCRIPTION OF PREFERRED EMBODIMENTS

This description relates to systems using satellites in low Earth orbit (LEO), for example, such as the Globalstar system.

A system of this kind uses a satellite at an altitude of around 1,390 kilometers, for example, travelling at a speed in the order of 7.2 kilometers per second, for example, as a relay station between a terminal and a base station.

The satellite receives the radio signal from the base station and retransmits it to the terminal on a carrier. The satellite simply acts as a "mirror": it transmits the signal it receives from the base station without modification, or at most after transposing its frequency.

As already mentioned, what is important is to estimate the time for which the satellite will remain in view, i.e. the time for which the terminal will be able to use the satellite. This time of use is limited by the disappearance of the satellite over the horizon, for example, or by the satellite reaching a predetermined elevation.

An advantageous method for this involves measuring in the terminal the Doppler shift of the carrier transmitted by the satellite.

A method for measuring this shift will now be described.

Figure 1:
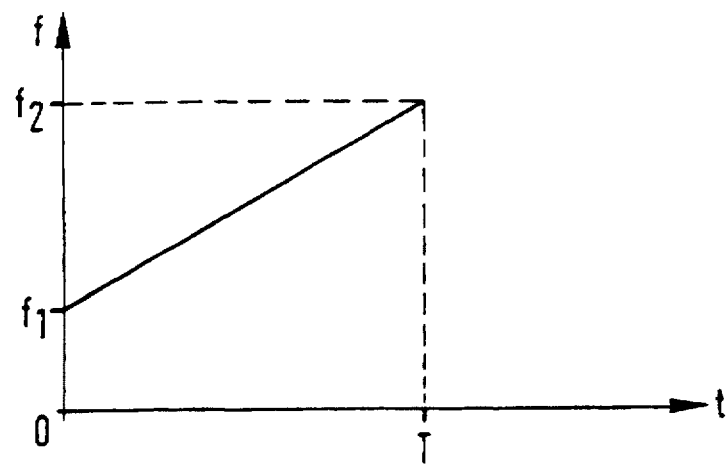
FIG. 1 shows one example of a reference signal used by measuring means suitable for the invention.

Referring to FIG. 1, the carrier conveys a signalling packet. A packet is defined as a support of a signal during a particular time T. In the present instance this signal, the reference signal, has a frequency that varies as a linear function of time. Taking the packet start as the time origin $t$, the instantaneous frequency $f$ of this signal can be represented by the following expression:

$$f = \left( \frac{f_2 - f_1}{T} \right) \cdot t + f_1$$

The signal is assumed to be of constant amplitude and it can naturally be an analog signal or a digital signal.

Figure 2:
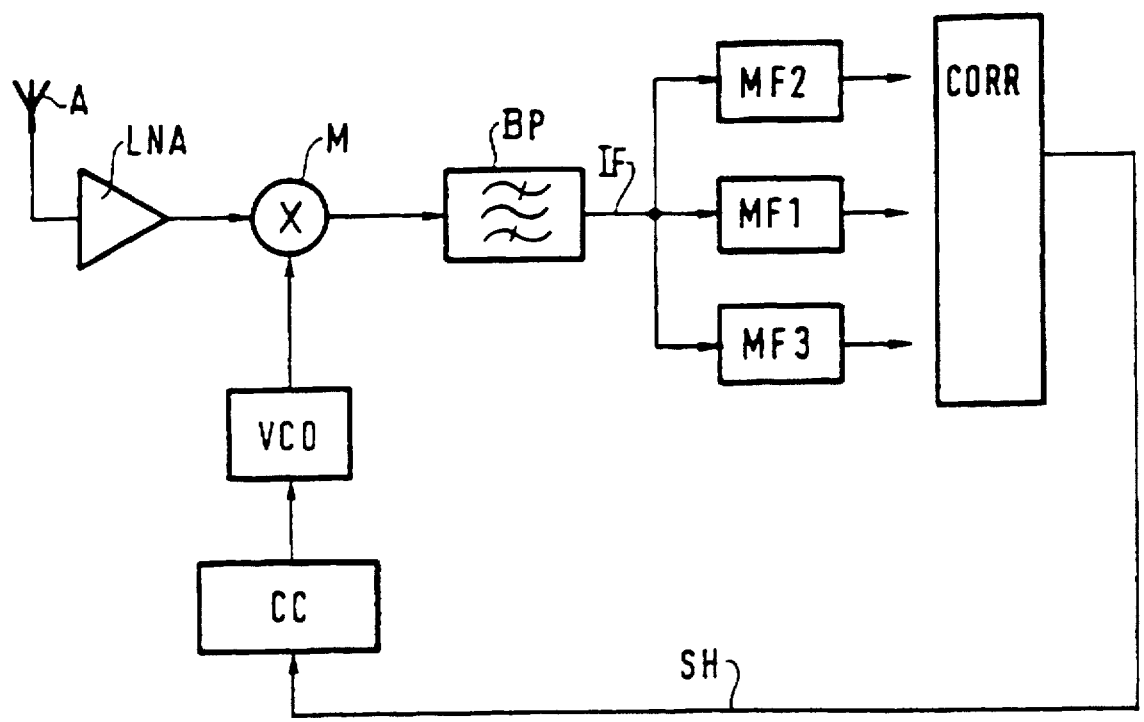
FIG. 2 is a diagram showing the components needed to implement these measuring means.

FIG. 2 shows the components of one embodiment of a receiver. In a manner that is known in itself, the receiver comprises an antenna A for receiving the carrier. This antenna is followed by an amplifier, usually a low-noise amplifier LNA.

The receiver also comprises a mixer M which receives the output signal of the amplifier LNA and the output signal of a local oscillator, for example a voltage-controlled oscillator VCO. This oscillator is controlled by a control circuit CC the function of which is explained below. The output of the mixer is connected to a bandpass filter BP which produces an intermediate frequency signal IF at its output. The bandpass filter meets the usual criteria of sideband rejection and phase distortion. Its center frequency and its bandwidth are defined below.

The receiver is designed to operate at a particular intermediate frequency called the theoretical frequency $f_T$ which corresponds to the situation in which there is no Doppler shift.

Assume now that the carrier is subject to the Doppler effect: the frequency of the intermediate frequency signal varies between $f_T - \Delta f$ and $f_T + \Delta f$ where $\Delta f$ represents the amplitude of the Doppler shift, for a control voltage of the local oscillator VCO that should produce a frequency equal to $f_T$. Consequently, the center frequency of the bandpass filter BP is made equal to $F_T$ and its bandwidth is made equal to that of the signal increased by $2 \cdot \Delta f$.

In accordance with the invention, the receiver comprises three filters tuned to the reference signal:

the first MF1 centered on the theoretical frequency $f_T$, the second MF2 centered on the theoretical frequency $f_T$ minus the amplitude of the Doppler shift, i.e. $f_T - \Delta f$, the third MF3 centered on the theoretical frequency $f_T$ plus the amplitude of the Doppler shift, i.e. $f_T + \Delta f$.

These tuned filters can be surface acoustic wave filters, for example

Figure 3:
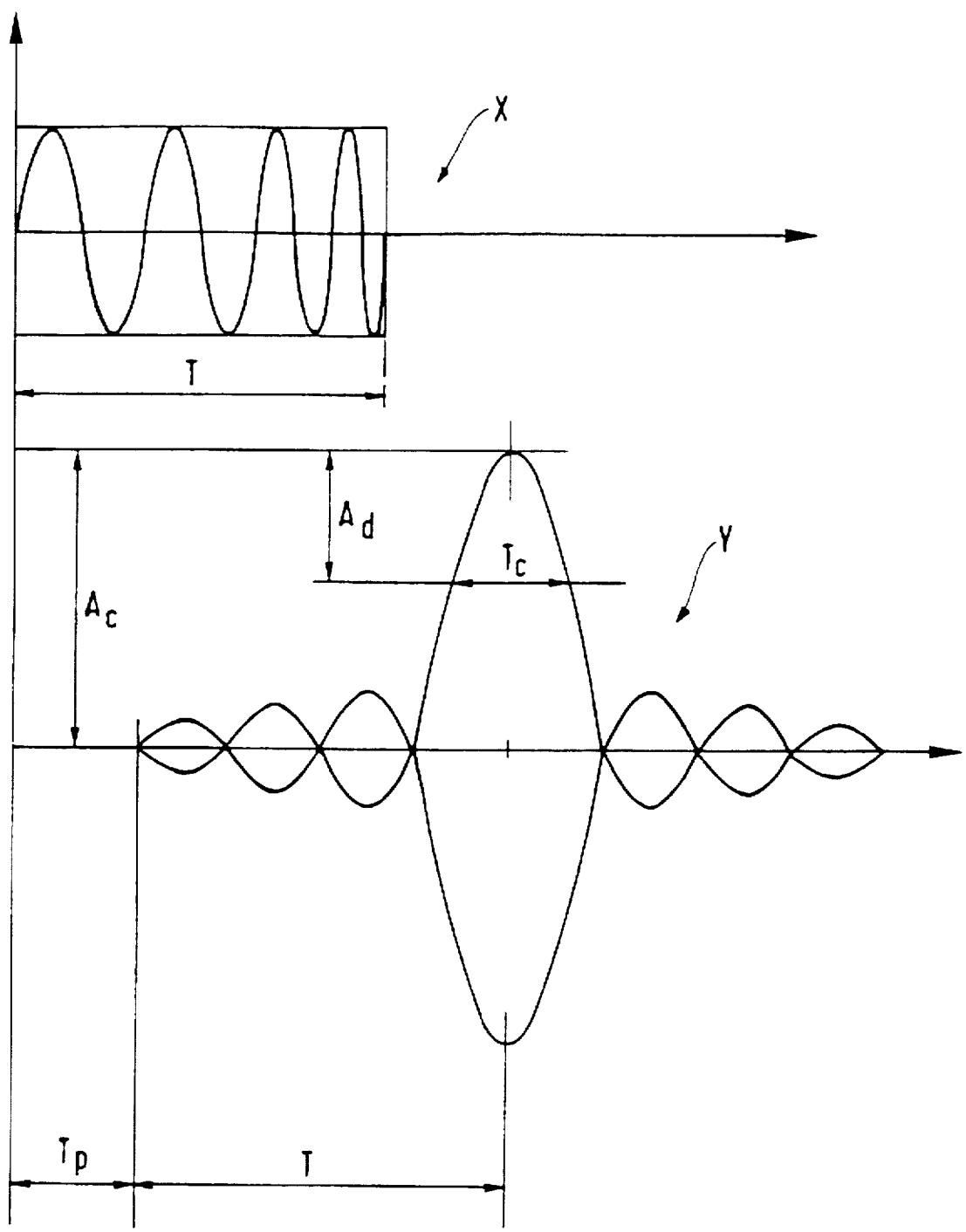
FIG. 3 shows the waveform of the input signal and of the output signal of a tuned filter used in one embodiment of the measuring means.

FIG. 3 shows the input signal X and the envelope Y of the output signal of a filter of this kind using the same time scale.

The filter has a propagation time $T_p$ and produces an output signal the waveform of which, familiar to the person skilled in the art, is a damped sin x/x function and which therefore has a main lobe with the peak value $A_c$ and the width of which, measured at an amplitude equal to the peak value $A_c$ less a predetermined value $A_d$ (20 dB, for example) is $T_c$.

A form factor W that characterizes the shape of the main lobe is determined. The peak value $A_c$ or the energy contained in this lobe or the width $T_c$ of this lobe could be chosen. Here, by way of example, the ratio of the peak value $A_c$ to the width $T_c$ has been chosen:

$$W = A_c/T_c$$

Each of the three tuned filters MF1, MF2, MF3 has a bandwidth such that an input signal corresponding to the reference signal but with its frequency shifted $\Delta f$ relative to its tuned frequency gives a form factor W above a detection threshold $S_d$ so that the corresponding main lobe can be detected.

The receiver further comprises a correction circuit CORR shown in FIG. 2. This circuit receives the output signals of the first, second and third tuned filters MF1, MF2 and MF3 and calculates respective first, second and third form factors $W_1$, $W_2$ and $W_3$. A form factor whose value is below the detection threshold $S_d$ is forced to zero. The correction circuit CORR produces a shift signal SH that is sent to the control circuit, as follows:

$$SH = \frac{W_2 - W_3}{W_1 + W_2 + W_3} \cdot \Delta f$$

This is the opposite of the barycenter of the center frequencies of the tuned filters weighted by the corresponding form factors. A value proportional to this barycenter or any other value could be chosen provided that it represents the difference between the theoretical frequency $f_T$ and the frequency of the intermediate frequency signal.

Remember that the aim is to measure and to correct the Doppler shift of the carrier which is assumed to be the carrier conveying the signalling packet.

Remember also that the signalling packet of duration T is transmitted periodically with a repetition period $T_r$.

Accordingly, the control circuit CC controls the local oscillator VCO so that the intermediate frequency signal IF is at the frequency $f_T$ if the carrier is not subject to the Doppler shift. At the end of a first latent period of at least $T+T_r$, the control circuit receives the shift signal SH, the value of which is $D_1$. It then controls the local oscillator VCO so that it produces a frequency increased by $D_1$.

It then waits for a second latent period to read the new value $D_2$ of the shift signal SH and again corrects the local oscillator VCO so that it produces a frequency increased by $D_2$. This procedure continues until after the nth latent period the shift signal SH has the value $D_n$.

If $D_n$ is below a correction threshold $S_c$ that is deemed to be sufficient in the present application, for example 100 Hz, the Doppler shift is corrected and its value D is:

$$D = \sum_{i=1}^{n} D_i$$

So far three tuned filters have been used. In many cases the amplitude of the Doppler shift $\Delta f$ allows the use of a single tuned filter centered on the theoretical frequency $f_T$ and the bandwidth of the filter is chosen so that its form factor is above the detection threshold $S_d$ if the input signal corresponds to the reference signal shifted by $\pm \Delta f$.

In this case, the control circuits CC controls the local oscillator VCO so that the intermediate frequency signal IF is at the frequency $f_T$ if the carrier is not subject to the Doppler effect.

The correction circuit CORR now produces as the shift signal SH the form factor from the single tuned filter.

At the end of a first latent period the value of the form factor is $W_{T0}$. The control circuit CC then controls the local oscillator VCO so that it reduces the intermediate frequency by $\Delta f/2$ and at the end of a second latent period registers the value $W_{m0}$ of the form factor. The control circuit CC then controls the local oscillator VCO so that it increases the intermediate frequency by $\Delta f/2$ and at the end of a third latent period registers the value $W_{M0}$.

It then determines which of the three values $W_{T0}$, $W_{m0}$ and $W_{M0}$ is the greatest. It is denoted $W_{T1}$ and it is clear that the frequency $F_1$ that produced this value is that nearest the tuned frequency.

The control circuit CC next controls the local oscillator VCO so that it produces the intermediate frequency $F_1 - \Delta f/4$. At the end of a fourth latent period it registers the value $W_{m1}$ of the shift signal. It then determines which of the three values $W_{T1}$, $W_{m1}$ and $W_{M1}$ is the greatest. It is denoted $W_{T2}$ and it is clear that the frequency $F_2$ that produced this value is that nearest the tuned frequency.

The process continues in the same manner, with the local oscillator controlled to produce the intermediate frequencies $F2 \pm \Delta f/8$. This search by successive approximations is continued with the halved frequency excursion each time to obtain $F_n$ such that $\Delta f/2^n$ is below a correction threshold $S_c$ that is deemed to be sufficient in the present application, for example 100 Hz.

The Doppler shift D is then corrected and its value is:

$$D = F_n - f_T$$

The Doppler shift correction device has been described with one or three tuned filters using the surface acoustic wave technology. This example has been chosen because of its familiarity to the person skilled in the art, especially if the intermediate frequency is in the order of 10 MHz to a few tens of MHz.

The person skilled in the art knows that these filters can be implemented digitally using a digital signal processor. This implementation is particularly suitable for narrow-band systems in which channels are spaced by around 30 kHz, for example. An intermediate frequency equal to zero can then be chosen to process the signal directly in the baseband.

It is further clear that the combination of the tuned filters and the correction circuit can be represented as a single entity called an analyzer circuit hereinafter.

Also, the reference signal has been described as a signal whose frequency varies linearly with time. This is a simple example, of course, and many other variation laws are feasible, all the more so if digital signal processing is used.

Further, the analyzer circuit that estimates the Doppler shift is implemented using one or more filters. There are other solutions, including spectrum analysis using a fast fourier transform, for example, that will not be described in further detail here since they are well known to the person skilled in the art.

Also, the signalling packet repetition frequency, which is the reciprocal of the repetition period $T_r$, is usually proportional to the carrier frequency, but is very much less than it, with the result that it is much less affected by the Doppler effect. This repetition frequency can therefore be acquired initially by measuring the time interval between two successive main lobes at the output of a tuned filter, as already explained. This produces a good approximation of the time reference of the base station and the control circuit CC corrects the local oscillator VCO so that it adopts this reference.

The Doppler shift can then be estimated as explained above, there being virtually no error in this estimate due to the difference between the time references of the base station and the terminal.

Figure 4:
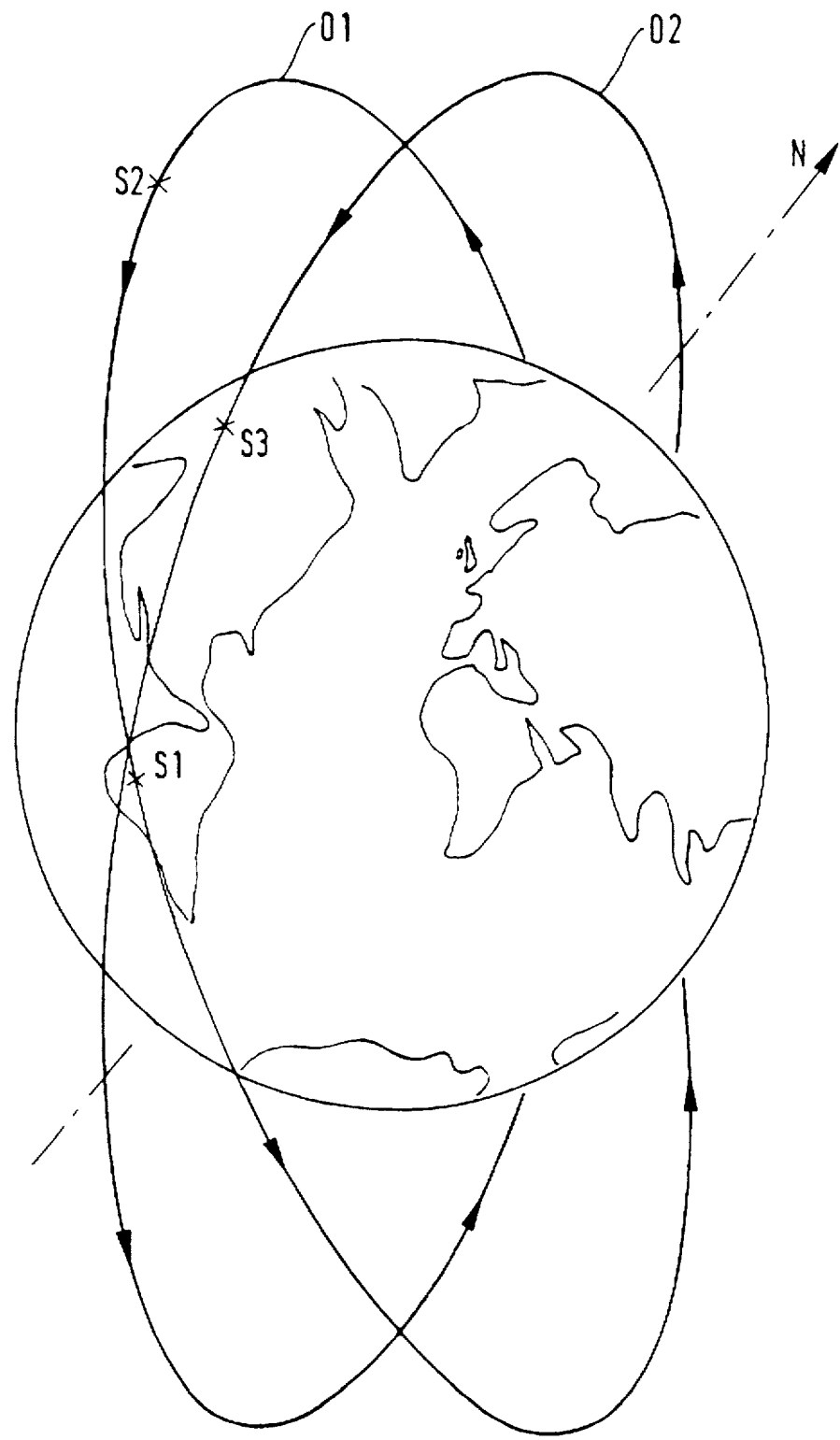
FIG. 4 shows the configuration of a terminal and a plurality of proximity satellites.

Now that the Doppler shift measuring means in the terminal have been described, a particular configuration of the system will be explained with reference to FIG. 4. In this figure, given by way of purely illustrative example, the Earth is shown with its North-South axis together with a terminal T and two orbits O1, O2. Also shown are three candidate proximity satellites, the first and second satellites S1, S2 being on the first orbit O1 and the third satellite S3 on the second orbit O2.

The Doppler shift depends on the elevation of the satellite relative to the terminal, i.e. the angle between the plane tangential to the Earth passing through the terminal and the straight line segment joining the terminal to the satellite. It is usual to employ a satellite at an elevation greater than a given minimal elevation that corresponds to a time of disappearance.

The form of the Doppler shift as a function of time depends on the elevation of the satellite for a fixed point on the Earth. If this elevation is varied, there results a family of curves well known to the person skilled in the art which varies between two extremities for a given minimal elevation, for example 20°, a maximum frequency $f_M$ and a minimum time $T_m$, and a minimum frequency $f_m$ and a maximum time $T_M$, the maximum time corresponding to the time of disappearance. The absolute values of $f_m$ and $f_M$ are the same but they are of opposite sign.

These curves have a single common point the coordinates of which are $(T_m+T_M)/2$ and $(f_m+f_M)/2$. As a direct consequence of this feature, if the value of the Doppler shift is known at two times separated by a known period, the curve on which the satellite is situated is known.

Figure 5:
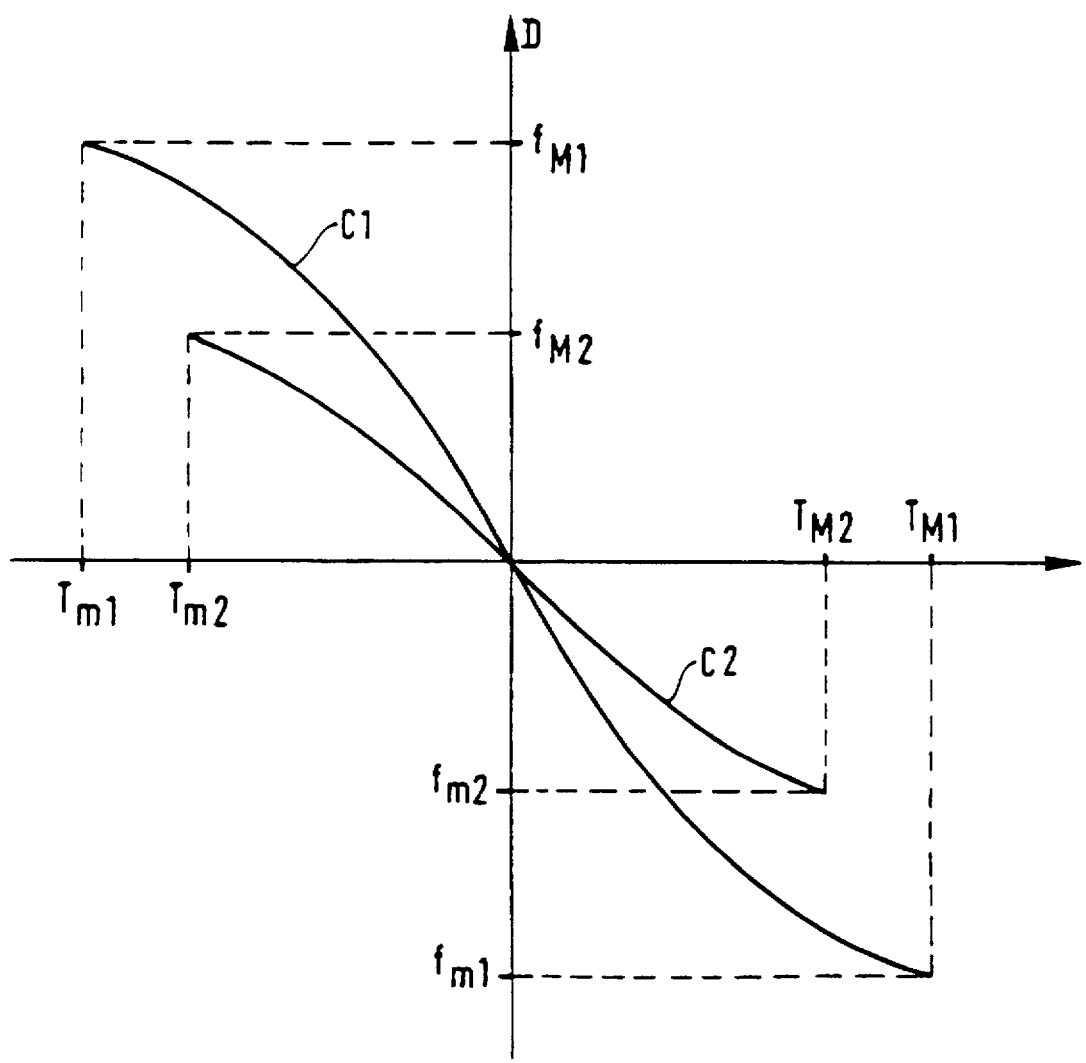
FIG. 5 shows the variation of the Doppler shift as a function of time.

FIG. 5 shows two of these curves representing the value of the Doppler shift D as a function of time, the first curve C1 corresponding to the first orbit O1 and varying between the points $(T_{m1}, f_{M1})$ and $(T_{M1}, f_{m1})$ and the second C2 corresponding to the second orbit O2 and varying between the points $(T_{m2}, f_{M2})$ and $(T_{M2}, f_{m2})$.

It is immediately apparent that a satellite in the first orbit has a potential time of use $(T_{M1}, T_{m1})$ greater than that $(T_{M2}, T_{m2})$ of a satellite in the second orbit.

The time in view is greater for the lefthand part of the curve, i.e. for high values of the shift. Thus, to a first approximation, it can be said that the greater the shift the longer the time in view. Estimator means can therefore be provided to establish an estimated time in view as an increasing function of the Doppler shift, an equality function, for example.

These curves also show that for a positive value of the shift, the greater the shift the lower its slope. Accordingly, a further approximation can be adopted whereby, if a form factor is defined as the opposite of the slope assigned the sign of the shift, the time in view is proportional to the reciprocal of the form factor. The slope is calculated by extrapolation from the Doppler shifts measured at two separate times separated by a known measurement period.

Combining the two approximations referred to above, it appears that the time in view can be estimated by a third method which calculates the ratio of the mean value of the shift during the measurement period to the corresponding slope.

It can be seen that in all cases the satellite S2 will be selected, which is desirable since it is in an orbit relatively close to a vertical line through the terminal, is relatively far from the terminal and is moving towards it.

A more accurate but more complicated method of estimation will now be described.

Figure 6:
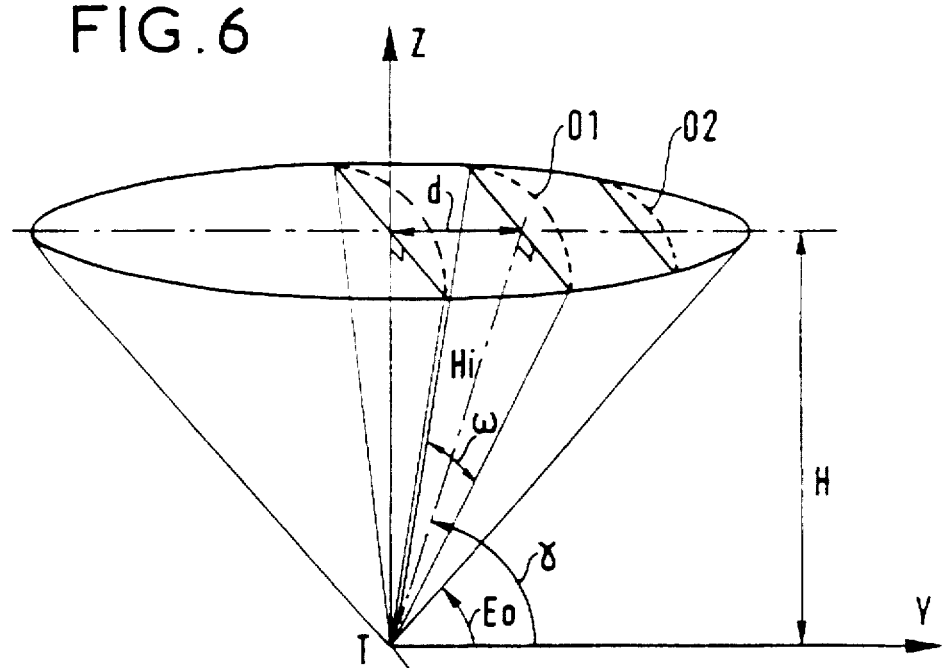
FIG. 6 shows a reference trihedron tied to the terminal and the proximity satellites therein.
Figure 7:
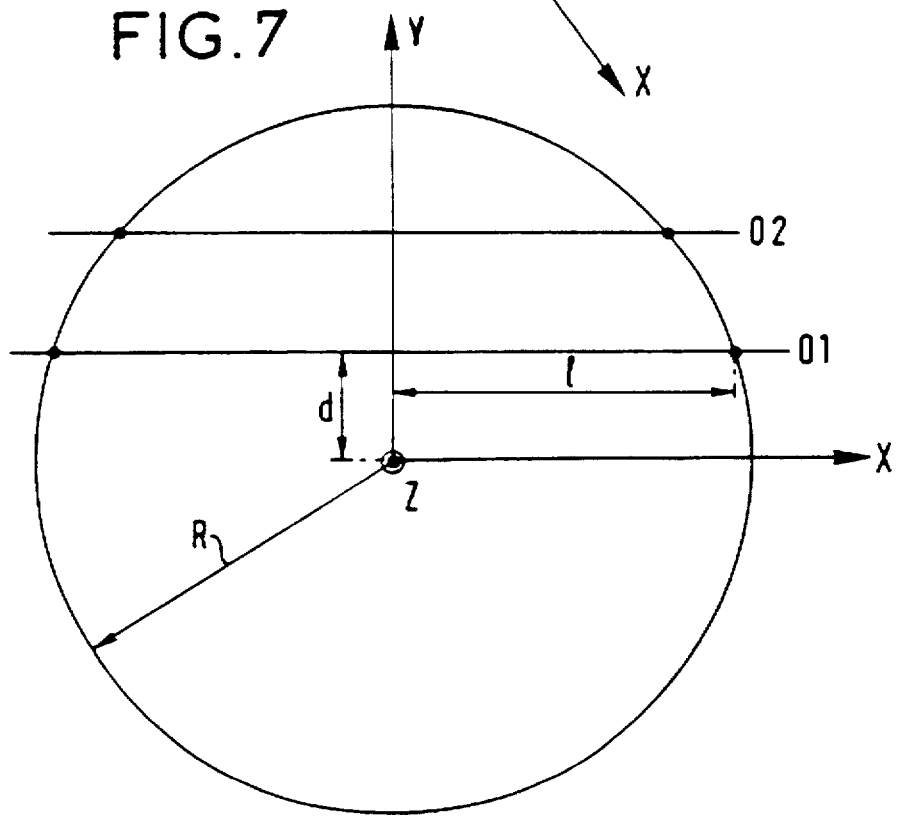
FIG. 7 shows this trihedron in plan view corresponding to the minimal elevation of the proximity satellites.

The value of the elevation $\epsilon(t)$ of a satellite at any point in an orbit, provided that this elevation is greater than the minimal elevation $E_0$, can be expressed in the following manner (see FIGS. 6 and 7 which respectively show a reference trihedron Txyz centered on the terminal T, with the Tz axis vertical, and a plane perpendicular to this vertical of altitude H).

All the satellites travel at an altitude H. Consequently, the set of possible orbits represents a sphere the center of which is that of the Earth. For the terminal, this set is limited to a spherical dome delimited by the intersection of a cone of angle $\pi/2-E_0$ with this sphere, where $E_0$ represents the minimal elevation The following notation is adopted for a particular orbit, for example the first orbit O1:

γ: maximal elevation in that orbit, $H_i$: distance from the terminal T to the chord subtended by the two points on this orbit on the spherical dome that correspond to the minimal elevation $E_0$.

ω: angle between the two straight line segments through the origin and through the two points on this orbit on the spherical dome that correspond to the minimal elevation $E_0$.

d : distance from this chord to the Oz axis, l : half-length of this chord,

R : radius of the spherical dome for the minimal elevation $E_0$, i.e. the maximal value of d, Ω: angular speed of the satellite, v : linear speed of the satellite, c : propagation speed of radio waves, p : carrier frequency, D : Doppler shift.

We can then write:

$$d = H \tan(\pi/2 - \gamma) = H/\tan(\gamma)$$

$$R = H \tan(\pi/2 - E_0) = H/\tan(E_0)$$

$$l = \sqrt{R^2 - d^2} = H\sqrt{\frac{1}{\tan^2(E_0)} - \frac{1}{\tan^2(\gamma)}}$$

$$\cos(\pi/2 - \gamma) = H/H_i = \sin(\gamma)$$

whence:

$$H_i = H/\sin(\gamma)$$

$$\tan(\omega/2) = 1/H_i = \frac{\sqrt{\frac{1}{\tan^2(E_0)} - \frac{1}{\tan^2(\gamma)}}}{\frac{1}{\sin(\gamma)}} \text{ whence:}$$

$$\omega = 2 \text{ Arctan} \left[ \sin(\gamma) \sqrt{\frac{1}{\tan^2(E_0)} - \frac{1}{\tan^2(\gamma)}} \right]$$

The elevation $\epsilon(t)$ therefore varies with time in the range $[\pi/2-\omega/2 \;\; \pi/2+\omega/2]$.

The value of the Doppler shift D is given by:

$$D = \frac{v}{c} \cdot p \cdot \sin(\gamma) \cdot \cos(\epsilon(t,\gamma))$$

With $\epsilon_0 = \pi/2 - \omega/2$, the value of the elevation $\epsilon(t,\gamma)$ is:

$$\epsilon(t,\gamma) = \epsilon_0 + \Omega t$$

Thus knowing two particular values of the Doppler shift, the second measured a known measurement period after the first, the value of the maximal elevation $\gamma$ on the orbit in question can be found and thus the general form of the shift D as a function of time. At this point it is a simple matter to determine the time of disappearance $T_M$ and to deduce from it the time in view, which is the difference between this time and of disappearance and the time at which the second shift was measured.

The estimator means can therefore calculate the time in view in this way.

Note that two successive values of the shift are sufficient to obtain the time in view. A double input table, for example a table stored in memory, can therefore be provided with the first input corresponding to the first shift measurement and the second input corresponding to the second shift measurement, any location in the table representing the corresponding time in view.

The table can be drawn up using the above equations or empirically. It is feasible to take measurements in the field for the various possible situations.

In conclusion, it is clear that the measuring means must be in the terminal. This does not necessarily apply to the estimator means which may comprise a microprocessor, a digital signal processor, for example.

In a first option, the estimator means are also in the terminal and can be implemented by the control circuit, for example. In this case transmission means are provided for sending the time in view to the assignment device which can be anywhere within the system. Note that these transmission means can be provided by the transmission circuit already present in the terminal.

In a second option, the estimator means can be elsewhere, and in particular in the assignment device. In this case transmission means are provided for sending the location information to the assignment device.

What is claimed is:

1. Device for selecting a satellite for a terminal (T) of a radiocommunication system comprising a plurality of non-geostationary satellites, characterized in that it comprises measuring means for establishing location information (D) dependent on the position of the terminal relative to each of a plurality of proximity satellites (S1, S2, S3) to which it has acquired synchronization, estimator means for estimating the time in view of each of said satellites from said location information and selector means for selecting that one of said satellites (S2) having the greatest estimated time in view.

2. Device according to claim 1 characterized in that, each of said satellites transmitting a separate carrier, said measuring means produce as location information the Doppler shift (D) of said carrier at a first time.

3. Device according to claim 2 characterized in that said estimated time in view is an increasing function of the value of the Doppler shift (D) at said first time.

4. Device according to claim 2 characterized in that, said measuring means also producing the value of the Doppler shift (D) at a second time separated from said first time by a measurement period, a form factor being defined as the ratio of the difference between the Doppler shifts at said first and second times to said measurement period assigned the sign of the Doppler shift at said first time, said estimated time in view is an increasing function of the inverse of said form factor.

5. Device according to claim 2 characterized in that, said measuring means further producing the value of the Doppler shift (D) at a second time, a form factor being defined as the ratio of the sum of the difference between the Doppler shifts at said first time and at said second time, said estimated time in view is an increasing function of said form factor.

6. Device according to claim 2 characterized in that, said measuring means further producing the value of the Doppler shift (D) at a second time separated from said first time by a measurement period, the function representing the Doppler shift including the time of disappearance ($T_M$) being determined by the value of the Doppler shift at said first and second times, said estimated time in view is the difference between said time of disappearance and said second time.

7. Location device for a terminal (T) of a radiocommunication system comprising a plurality of non-geostationary satellites and an assignment device for assigning a satellite to that terminal characterized in that, the terminal (T) having acquired synchronization to a plurality of proximity satellites (S1, S2, S3), it comprises measuring means for establishing location information (D) dependent on the position of the terminal relative to each of said proximity satellites, estimator means for estimating the time in view of each of said proximity satellites from said location information and transmission means for transmitting to said assignment device the estimated time in view of at least two of said proximity satellites for which said time is the greatest.

8. Assignment device for a radiocommunication system comprising a plurality of non-geostationary satellites, adapted to assign a satellite to a terminal (T) from a plurality of proximity satellites (S1, S2, S3) to which said terminal has acquired synchronization, characterized in that, said terminal comprising measuring means for establishing location information (D) dependent on its position relative to each of said proximity satellites, estimator means for estimating the time in view of said proximity satellites from said location information and transmission means for transmitting to said assignment device the estimated time in view of at least two of said proximity satellites, it selects a satellite in accordance with the greatest of said estimated times in view transmitted by said terminal.

9. Assignment device for a radiocommunication system comprising a plurality of non-geostationary satellites adapted to assign a satellite to a terminal (T) from a plurality of proximity satellites (S1, S2, S3) to which said terminal has acquired synchronization, characterized in that, said terminal comprising measuring means for establishing location information (D) dependent on its position relative to each of said proximity satellites and transmission means for transmitting to said assignment device said location information of at least two of said proximity satellites, it comprises estimator means for estimating the time in view of said proximity satellites from said location information transmitted by said terminal in order to select a satellite having the greatest of said estimated times in view.

10. A location device for a terminal (T) of a radiocommunication system comprising a plurality of nongeostationary satellites and an assignment device for assigning a satellite to said terminal characterized in that, the terminal having acquired synchronization to a plurality of proximity satellites (S1, S2, S3), it comprises measuring means for establishing location information (D) according to the position of the terminal relative to each of said proximity satellites and transmission means for transmitting said location information to said assignment device; and in that, each of said satellites (S1, S2, S3) transmitting a separate carrier, said location information is the Doppler shift (D) of said carrier.

* * * * *